(12) United States Patent
Qu et al.

(10) Patent No.: US 9,584,550 B2
(45) Date of Patent: *Feb. 28, 2017

(54) EXPLOIT DETECTION BASED ON HEAP SPRAY DETECTION

(71) Applicant: Palo Alto Networks, Inc., Santa Clara, CA (US)

(72) Inventors: Bo Qu, Fremont, CA (US); Kyle Sanders, Sunnyvale, CA (US); Xinran Wang, San Ramon, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,048

(22) Filed: Mar. 10, 2016

(65) Prior Publication Data

US 2016/0269443 A1 Sep. 15, 2016

Related U.S. Application Data

(63) Continuation of application No. 13/951,316, filed on Jul. 25, 2013, now Pat. No. 9,336,386.

(60) Provisional application No. 61/834,364, filed on Jun. 12, 2013.

(51) Int. Cl.
| | |
|---|---|
| H04L 29/06 | (2006.01) |
| G06F 21/55 | (2013.01) |
| G06F 21/56 | (2013.01) |
| G06F 21/52 | (2013.01) |

(52) U.S. Cl.
CPC .............. *H04L 63/20* (2013.01); *G06F 21/52* (2013.01); *G06F 21/55* (2013.01); *G06F 21/56* (2013.01); *H04L 63/0245* (2013.01); *H04L 63/10* (2013.01); *H04L 63/1416* (2013.01); *H04L 63/1425* (2013.01)

(58) Field of Classification Search
CPC .................................................. H04L 63/1416
See application file for complete search history.

(56) References Cited

U.S. PATENT DOCUMENTS

| | | | | |
|---|---|---|---|---|
| 2003/0115485 A1* | 6/2003 | Milliken | ................ | G06F 21/562 726/24 |
| 2009/0300764 A1* | 12/2009 | Freeman | ................. | G06F 21/55 726/24 |
| 2011/0030060 A1* | 2/2011 | Kejriwal | ............... | G06F 21/566 726/25 |
| 2014/0123283 A1* | 5/2014 | Liu | ........................ | G06F 21/566 726/23 |

* cited by examiner

*Primary Examiner* — William Powers
*Assistant Examiner* — Thanh Le
(74) *Attorney, Agent, or Firm* — Van Pelt, Yi & James LLP

(57) ABSTRACT

Various techniques for exploit detection based on heap spray detection are disclosed. In some embodiments, exploit detection based on heap spray detection includes executing a program in a virtual environment; and detecting heap spray in memory while executing the program in the virtual environment. In some embodiments, exploit detection based on heap spray detection includes executing a program in a virtual environment; and detecting heap spray related malware in response to a modification of an execution environment in the virtual environment.

21 Claims, 4 Drawing Sheets

EXPLOIT DETECTION BASED ON HEAP SPRAY DETECTION

CROSS REFERENCE TO OTHER APPLICATIONS

This application claims priority to co-pending U.S. patent application Ser. No. 13/951,316, entitled EXPLOIT DETECTION BASED ON HEAP SPRAY DETECTION, filed Jul. 25, 2013, which claims priority to U.S. Provisional Patent Application No. 61/834,364, entitled EXPLOIT DETECTION BASED ON HEAP SPRAY DETECTION, filed Jun. 12, 2013, both of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
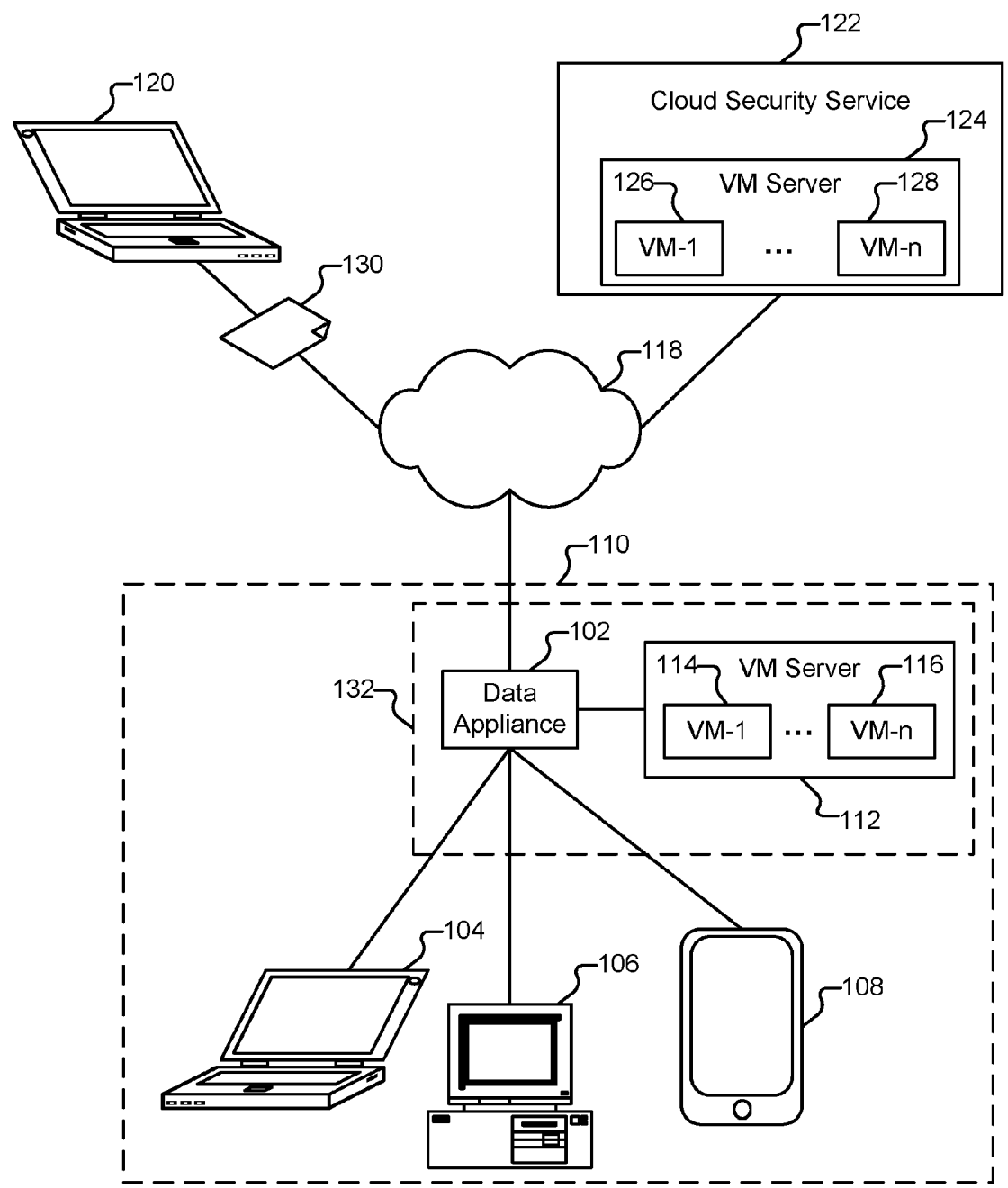
FIG. 1 is a functional diagram of an architecture for providing exploit detection based on heap spray detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, a significant challenge for security detection techniques is to identify threats (e.g., malware, which refers to malicious programs, such as programs attempting to perform malicious or undesired actions) attempting to use new exploits, such as zero-day threats that have not previously been identified. For example, a new zero-day threat that has not previously been identified (e.g., for which no signature yet exists) can exploit new or unresolved vulnerabilities in an application or operation system.

Heap spraying is a technique that can be used in exploits to facilitate arbitrary code execution. In general, this technique attempts to insert a certain sequence of bytes at a predetermined location in the memory of a target process by allocating blocks of memory (e.g., large allocated blocks of memory) on the process's heap and filling the bytes in these blocks with the certain sequence of bytes starting at a predetermined location within the allocated blocks (e.g., NOP (no operation instruction on the target architecture) is used to pre-fill or offset within the block before the start of the certain sequence of bytes).

Although heap spray does not actually exploit any security issues, heap spray techniques can be used by malware to make a security issue easier (e.g., or more reliable) to exploit. Thus, a separate security issue (e.g., exploit) is typically used by a program that performs malicious heap spraying techniques. In particular, heap spraying techniques can be used to leverage the design of most architectures and operating systems such that a start location of a large heap allocation is generally predictable and consecutive allocations are approximately sequential. As a result, in most architectures and operating systems, heap spray techniques can leverage the fact that a sprayed heap will generally be in the same location each and every time the heap spray is executed.

Exploits often use specific bytes to spray the heap, as the data stored on the heap serves multiple roles. During exploitation of a security issue, the application code can often be made to read an address from an arbitrary location in memory. This address is then used by the code as the address of a function to execute. If the exploit can force the application to read this address from the sprayed heap, then the exploit can control the flow of execution when the code uses that address as a function pointer and redirects it to the sprayed heap. If the exploit succeeds in redirecting control flow to the sprayed heap, then the bytes there will be executed, allowing the exploit to perform whatever actions the attacker desires. Therefore, the bytes on the heap are restricted to represent valid addresses within the heap spray itself, holding valid instructions for the target architecture, so the application will not crash. This allows the heap spray to function as a very large NOP sled.

Examples of potentially malicious programs that perform heap spraying techniques include heap sprays for web browsers (e.g., commonly implemented using JavaScript to spray the heap by creating large strings), scripts performed by supported application environments (e.g., VBScript used in the Microsoft® Internet Explorer® browser or ActionScript used in the Adobe® Flash® application), image-based heap spraying techniques, heap spraying techniques using HTML5, and/or various other techniques that can be used to perform various heap spraying techniques.

Thus, what are needed are new and improved techniques for exploit detection based on heap spray detection. Accordingly, various techniques for exploit detection based on heap spray detection are disclosed.

In some embodiments, exploit detection based on heap spray detection includes exploit detection by detecting heap spray in memory. For example, heap spray is a common technique used in modern exploits as discussed generally above. In some embodiments, various heuristic techniques for detecting a memory allocation pattern are disclosed to detect heap spray in memory as further described below.

In some embodiments, exploit detection based on heap spray detection includes exploit detection by changing execution environments. For example, most modern exploits attempt to target multiple versions and/or platforms (e.g., checking such environments and then constructing the environment for exploiting). In some embodiments, various techniques for detecting such exploits are provided by implementing various modifications of the execution environment (e.g., changing a binary file version, changing a binary file base address, and/or replacing a binary file with an older version of that file) as further described below with respect to various embodiments. As a result, using such execution environment modification techniques, such exploits can fail, because the execution environment is altered thereby hindering or disrupting the desired execution environment required by the malicious heap spraying program. For example, a predefined address of an ROP gadget (e.g., Return Oriented Programming (ROP) based exploits) would no longer exist. As a result, these techniques can effectively differentiate normal program behaviors from malicious program behaviors, because normal operation would be processed while an attempted exploitation would generally crash the program. Furthermore, an attempted exploitation can be detected by scanning memory as an indication of an attack. For example, scanning memory can including identifying ROP gadgets or a de-obfuscated PE image in memory.

For example, such heap spray detection techniques can provide effective security detection techniques, because these techniques can detect various exploits (e.g., even the exploits that do not succeed). As another example, heap spraying detection techniques using a modification of the execution environment can efficiently differentiate normal, non-malicious program behaviors from suspicious, malicious behaviors, because normal operations generally would be processed while attempted exploitations would typically crash the program in these modified execution environments. Furthermore, the various heap spraying detection techniques disclosed herein generally result in less false positives and, thus, are more effective than other approaches. These and other examples are further described herein with respect to various embodiments.

In some embodiments, various techniques for exploit detection based on heap spray detection are disclosed. In some embodiments, exploit detection based on heap spray detection includes executing a program in a virtual environment, and detecting heap spray in memory while executing the program in the virtual environment. In some embodiments, the heap spray is detected based on a comparison (e.g., based on a threshold comparison) of each of a plurality of allocated blocks in memory. In some embodiments, the heap spray is determined to be malicious.

In some embodiments, exploit detection based on heap spray detection further includes receiving the program from a security device, in which the program corresponds to a malware sample (e.g., a potentially malicious code sample) that is monitored during execution in the virtual environment to determine whether the program indicates potentially malicious heap spray-related behavior.

In some embodiments, exploit detection based on heap spray detection further includes determining if the program is performing malicious heap spray in memory by comparing each of a plurality of allocated blocks in memory.

In some embodiments, exploit detection based on heap spray detection further includes calculating a hash of each allocated of a plurality of allocated blocks in memory; and determining if the program is performing malicious heap spray in memory.

In some embodiments, exploit detection based on heap spray detection further includes selecting a subset of each of a plurality of allocated blocks (e.g., a range that is based on a subset of each of the allocated blocks) for a hash calculation; calculating a hash of the selected subset of each of the plurality of allocated blocks in memory; and determining if the program is performing malicious heap spray in memory based on a comparison (e.g., a threshold comparison) of each hash of each of the plurality of allocated blocks in memory.

In some embodiments, exploit detection based on heap spray detection includes executing a program in a virtual environment; and detecting heap spray related malware in response to a modification of an execution environment in the virtual environment. In some embodiments, the heap spray is detected based on one or more of the following modifications of the execution environment: a change in a binary file version, a change in a binary file base address, and a replacement of a binary file with an older version of the binary file.

In some embodiments, exploit detection based on heap spray includes monitoring allocated memory for certain artifacts of exploitation (e.g., a de-obfuscated executable or beacon location).

Accordingly, various techniques for exploit detection based on heap spray detection are disclosed. As will be apparent to one skilled in the art in view of the various techniques and embodiments described herein, while the various techniques described herein for exploit detection based on heap spray detection are described with respect to virtual environments using a security service (e.g., a cloud security service), such techniques can similarly be applied to various other security environments, including, for example, performed in part or completely using security devices such as appliances, gateways, servers, and/or other security platforms capable of implementing various virtual environment techniques disclosed herein.

FIG. 1 is a functional diagram of an architecture for providing exploit detection based on heap spray detection in accordance with some embodiments. For example, such an environment can detect and prevent malware (e.g., malware that performs malicious heap spraying techniques) from causing harm. In particular, a variety of attempts by a malicious individual to propagate malware (e.g., malware 130) via system 120 are described, as are techniques for thwarting that propagation.

In the example shown in FIG. 1, client devices 104-108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, web site downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention, including various techniques for exploit detection based on heap spray detection as disclosed herein. As one example, data appliance 102 can be configured to provide a copy of malware 130 to one or more of the virtual machine servers for real-time analysis. As another example, service 122 can provide a list of signatures of known-malicious documents to appliance 102 as part of a subscription. Those signatures can be generated by service 122 in conjunction with the techniques described herein. For example, if service 122 identifies a new malware associated with the malware sample received from a data appliance (e.g., data appliance 102 or another data appliance), such as using various for exploit detection based on heap spray detection as disclosed herein, service 122 can automatically generate a new signature for the newly identified malware and send the new signature to various subscribers (e.g., data appliance 102 and various other data appliances that receive subscription-based signature updates).

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured).

Figure 3:
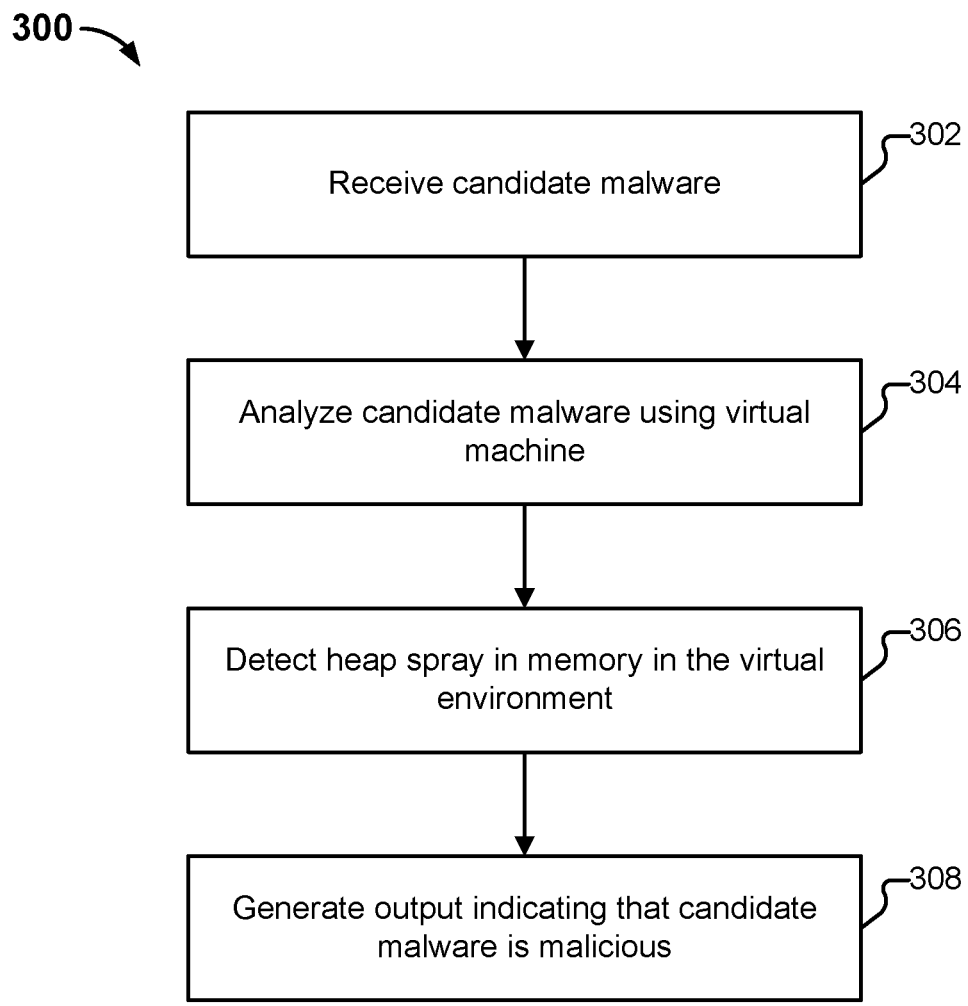
FIG. 3 is a flow diagram of a process for providing exploit detection based on heap spray detection in accordance with some embodiments.
Figure 4:
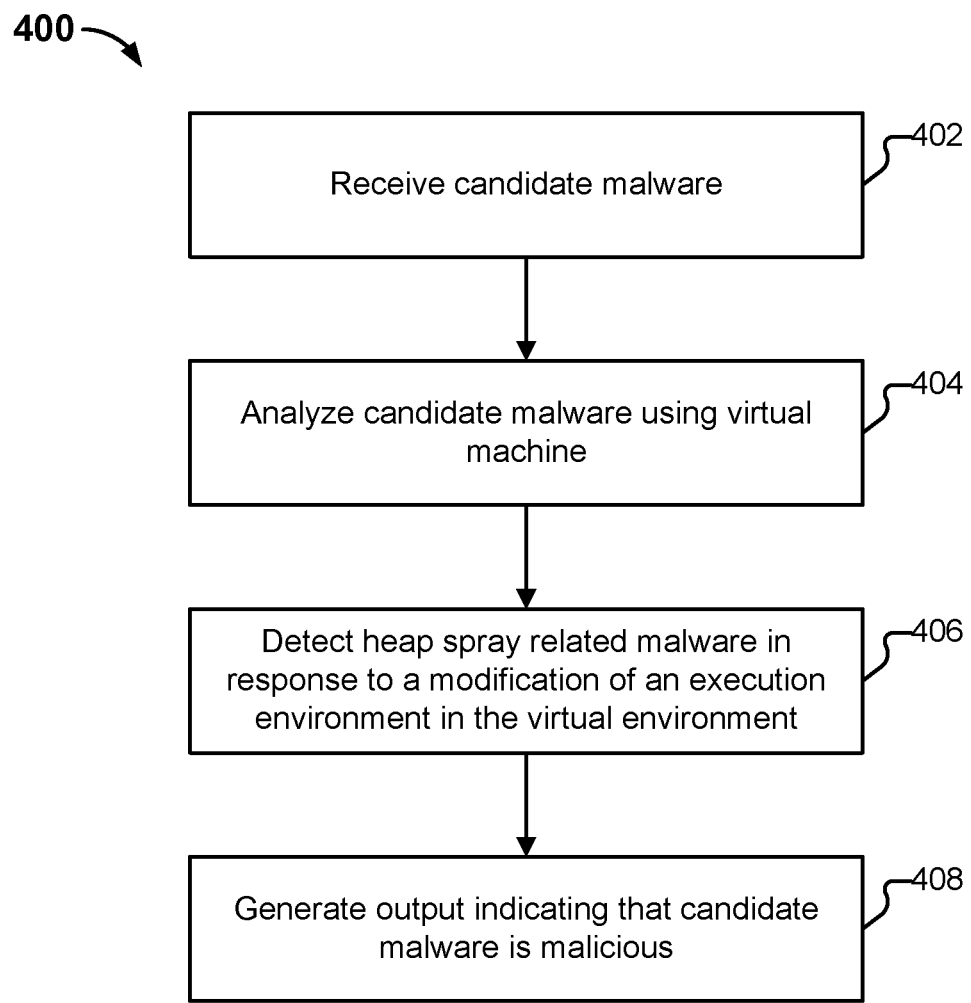
FIG. 4 is another flow diagram of a process for providing exploit detection based on heap spray detection in accordance with some embodiments.

In some embodiments, the virtual machine server 124 is configured to implement various emulation-based techniques for exploit detection based on heap spray detection as described herein with respect to various embodiments (e.g., implemented using a heap spray detection engine, which is executed by cloud security service 122 and/or malware analysis system 132, that uses an instrumented emulation environment to perform various emulation-based techniques for exploit detection based on heap spray detection, such as described below with respect to FIGS. 3 and 4 and with respect to various other embodiments disclosed herein). For example, the virtual machine server 124 can provide an instrumented emulation environment capable of performing the various techniques as described herein. These instrumented VM environments 126 and 128 can include, for example, various user level hooks and/or kernel level hooks in the emulated execution environment to facilitate the monitoring of the program behavior during execution in the virtual environment and to log such monitored program behaviors for analysis based on the various techniques described herein with respect to various embodiments. Also, in some cases, multiple instances of a malware sample can be performed using multiple VM environments to perform various tests and/or execute using different execution environments (e.g., different versions of an operating system (OS) environment, different versions of an application, etc.).

Figure 2:
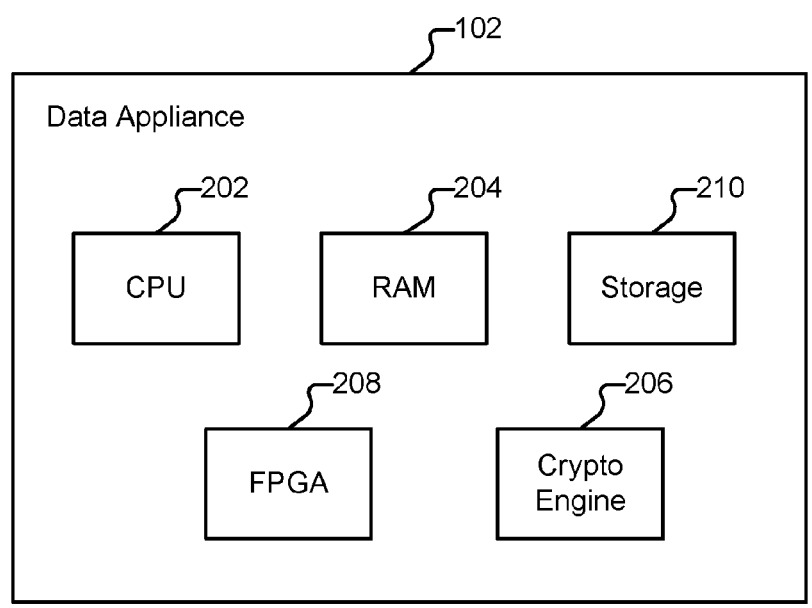
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Detect Heap Spraying in Memory

A virtual machine (VM) can be used to perform behavior profiling (e.g., in a VM sandbox environment) using various heuristic-based analysis techniques that can be performed in real-time during execution of the program in the virtual environment. As one example, suppose a malicious user of system 120 sends an email message to a user of client 104 that includes a suspicious or malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious. If no signature for the attachment is found, data appliance 102 is configured to provide the attachment to a virtual machine server, such as virtual machine server 112, for analysis, such as using various techniques for exploit detection based on heap spray detection, such as described herein with respect to various embodiments.

Virtual machine server 112 is configured to execute (or open, as applicable) the attachment in one or more virtual machines 114-116. The virtual machines may all execute the same operating system (e.g., Microsoft Windows) or may execute different operating systems or versions thereof (e.g., with VM 116 emulating an Android operating system). In some embodiments, the VM(s) chosen to analyze the attachment are selected to match the operating system of the intended recipient of the attachment being analyzed (e.g., the operating system of client 104). Observed behaviors resulting from executing/opening the attachment (e.g., to analyze the memory to detect heap spraying) are logged and analyzed for indications that the attachment is potentially malicious or malicious. In some embodiments, the VM(s) chosen to analyze the attachment are selected to modify the execution environment, such as to use a different version of the operating environment or to use various techniques for heap spray detection based on a modified execution environment, such as described herein with respect to various embodiments. In some embodiments, such VM-based analysis techniques are performed by the VM server (e.g., VM server 112). In other embodiments, such VM-based analysis techniques are performed at least in part by appliance 102 (e.g., or in some cases, such VM-based analysis techniques can be performed completed by the appliance 102). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the malware sample (e.g., attachment) is determined to be malicious, appliance 102 can automatically block the file download based on the analysis result. Further, in some embodiments, a signature can be generated and distributed (e.g., to other data appliances) to automatically block future file transfer requests to download the file determined to be malicious.

A variety of techniques for detecting heap spray will be described in conjunction with FIG. 3.

FIG. 3 is a flow diagram of a process for providing exploit detection based on heap spray detection in accordance with some embodiments. In various embodiments, process 300 is performed by malware analysis system 132. The process begins at 302 when candidate malware (e.g., a malware sample) is received. As one example, candidate malware is received at 302 when an email (e.g., including an attachment) is received by data appliance 102 from system 120. As another example, data appliance 102 can be configured to transmit the attachment to service 122 for analysis. In that scenario, the candidate malware is received by cloud security service 122 at 302.

At 304, the candidate malware is analyzed using one or more virtual machines by executing a program in a virtual environment. For example, the candidate malware can be executed in virtual machine 114 and any behaviors logged for analysis by system 132. As another example, the candidate malware can be executed in virtual machines 126-128 and analyzed by cloud security service 122.

In some embodiments, various heuristic techniques are used to detect whether the program (e.g., malware sample) executing in the virtual environment is performing heap spraying in memory. For example, each newly allocated block in memory can be examined to determine whether or not the program is performing heap spraying. In some cases, each newly allocated block of memory can be hashed (e.g., using a hash algorithm, such as MD5 or another hash algorithm), and the hash values of multiple allocated blocks of the memory can be compared to determine whether or not such match (e.g., based on a threshold comparison, such as determining that at least a certain percentage of the allocated blocks of memory match based on the comparison), thereby indicating heap spraying behavior. In some cases, a subset of the allocated blocks of memory is used for the hash calculation. In some cases, multiple hash calculations are performed using different subset selections of the allocated blocks of memory (e.g., to detect heap spraying in which a first portion of allocated blocks may be written with NOPs (no operation instructions on the target architecture) by the program attempting to spray the heap). In some cases, each time a new block of memory is allocated, the process of calculating hash values against each allocated block (e.g., or subset thereof) is performed again, and the hash value results of each allocated block are again compared (e.g., using a threshold comparison) to determine if heap spraying behavior is detected.

At 306, a determination is made as to whether the program is performing heap spraying in memory while executing the program in the virtual environment. And, if so, at 308, output is generated that indicates that the candidate malware is malicious. As one example, at 308, a signature for the attachment can also be generated (e.g., as an MD5 hash-based signature). As another example, instead of or in addition to generating a signature, an alert can be generated that instructs data appliance 102 not to provide the attachment to client 104.

Using Virtual Machines to Detect Heap Spray by Modifying an Execution Environment A variety of techniques for detecting heap spray by modifying an execution environment will be described in conjunction with FIG. 4.

FIG. 4 is another flow diagram of a process for providing exploit detection based on heap spray detection in accordance with some embodiments. In various embodiments, process 400 is performed by malware analysis system 132. The process begins at 402 when candidate malware (e.g., a malware sample) is received. As one example, candidate malware is received at 402 when an email (e.g., including an attachment) is received by data appliance 102 from system 120. As another example, data appliance 102 can be configured to transmit the attachment to service 122 for analysis. In that scenario, the candidate malware is received by cloud security service 122 at 402.

At 404, the candidate malware is analyzed using one or more virtual machines by executing a program in a virtual environment. For example, the candidate malware can be executed in virtual machine 114 and any behaviors logged for analysis by system 132. As another example, the candidate malware can be executed in virtual machines 126-128 and analyzed by cloud security service 122.

In particular, in accordance with some embodiments, an aspect of the virtual environment is modified to provide a modified execution environment. For example, a binary file version can be changed (e.g., changing an Adobe Flash version from version 11.1.115.36 to version 11.1.115.34). As another example, binary file base addresses can be changed (e.g., changing the base address of hxds.dll from 0x51bd0000 to 0x51bc0000). This causes exploits that rely on this specific address to crash, because the expected values will be different. As yet another example, a binary file can be replaced with an older version (e.g., msvcr100.dll). As similarly discussed above, the values in the newer version of the dll will be different and exploits rely on very specific values. By changing the execution environment, heap spray being performed by the candidate malware can be detected at 406, because the candidate malware can fail to execute in the modified execution environment.

At 406, a determination is made as to whether the program is performing heap spraying in memory by detecting heap spray related malware in response to a modification of an execution environment in the virtual environment. And, if so, at 408, output is generated that indicates that the candidate malware is malicious. As one example, at 408, a signature for the attachment can also be generated (e.g., as an MD5 hash-based signature). As another example, instead of or in addition to generating a signature, an alert can be generated that instructs data appliance 102 not to provide the attachment to client 104.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for exploit detection by detecting heap spray in memory, comprising:
   a processor configured to:
      execute a program in a virtual environment;
      monitor the program during execution in the virtual environment; and
      detect heap spray in memory while executing the program in the virtual environment based on a comparison of each of a plurality of allocated blocks in memory, comprising to:
         generate a first hash value of a first allocated block using a hash algorithm;
         generate a second hash value of a second allocated block using the hash algorithm; and
         determine whether the program is performing heap spraying based on a comparison of the first and second hash values; and
   a memory coupled to the processor and configured to provide the processor with instructions.

2. The system recited in claim 1, wherein the heap spray is determined to be malicious.

3. The system recited in claim 1, wherein the program corresponds to a malware sample that is monitored during execution in the virtual environment to determine whether the program indicates potentially malicious heap spray related behavior.

4. The system recited in claim 1, wherein the system includes a cloud security service, and wherein the processor is further configured to:
   receive the program at the cloud security service, wherein the program corresponds to a malware sample that is monitored during execution in the virtual environment to determine whether the program indicates potentially malicious heap spray related behavior.

5. The system recited in claim 1, wherein the processor is further configured to:
   log behaviors while executing the program in the virtual environment to determine whether the program indicates potentially malicious heap spray related behavior.

6. The system recited in claim 1, wherein the processor is further configured to:
   for each newly allocated block of memory of the plurality of allocated blocks in memory allocated during the execution of the program in the virtual environment, compare a sequence of bytes of the each newly allocated block of memory with a predetermined sequence of bytes.

7. The system recited in claim 1, wherein the processor is further configured to:
   perform a threshold comparison of each of the plurality of allocated blocks in memory to determine if the program is performing malicious heap spray in memory, wherein the threshold comparison includes determining that at least a predetermined number of the plurality of allocated blocks of memory match.

8. The system recited in claim 1, wherein the processor is further configured to:
   calculate a hash of each of the plurality of allocated blocks in memory; and
   determine if the program is performing malicious heap spray in memory based on a threshold comparison of each hash of each of the plurality of allocated blocks in memory.

9. The system recited in claim 1, wherein the processor is further configured to:
   select a subset of each of the plurality of allocated blocks in memory for a hash calculation;
   calculate a hash of the subset of each of the plurality of allocated blocks in memory; and
   determine if the program is performing malicious heap spray in memory based on a threshold comparison of each hash of the subset of each of the plurality of allocated blocks in memory.

10. The system recited in claim 1, wherein the processor is further configured to:
    select a plurality of subsets of each of the plurality of allocated blocks in memory for a plurality of hash calculations;
    calculate a hash of each of the plurality of subsets of each of the plurality of allocated blocks in memory; and
    determine if the program is performing malicious heap spray in memory based on a threshold comparison of each hash of each of the plurality of subsets of each of the plurality of allocated blocks in memory.

11. The system recited in claim 1, wherein the determining of whether the program is performing heap spraying comprises to:
    compare the first hash value and the second hash value;
    determine whether the first and second hash values match; and
    in the event that the first and second hash values match, determine that the program is performing heap spraying.

12. A method for exploit detection by detecting heap spray in memory, comprising:
    executing a program in a virtual environment using a processor;
    monitoring the program during execution in the virtual environment; and
    detecting heap spray in memory while executing the program in the virtual environment based on a comparison of each of a plurality of allocated blocks in memory, comprising:
       generating a first hash value of a first allocated block using a hash algorithm;
       generating a second hash value of a second allocated block using the hash algorithm; and
       determining whether the program is performing heap spraying based on a comparison of the first and second hash values.

13. The method of claim 12, wherein the heap spray is determined to be malicious.

14. The method of claim 12, wherein the program corresponds to a malware sample that is monitored during execution in the virtual environment to determine whether the program indicates potentially malicious heap spray related behavior.

15. The method of claim 12, further comprising:
    receiving the program at a cloud security service, wherein the program corresponds to a malware sample that is monitored during execution in the virtual environment to determine whether the program indicates potentially malicious heap spray related behavior.

16. The method of claim 12, further comprising:

logging behaviors while executing the program in the virtual environment to determine whether the program indicates potentially malicious heap spray related behavior.

17. The method of claim 12, further comprising:

for each newly allocated block of memory of the plurality of allocated blocks in memory allocated during the execution of the program in the virtual environment, comparing a sequence of bytes of the each newly allocated block of memory with a predetermined sequence of bytes.

18. The method of claim 12, further comprising:

performing a threshold comparison of each of the plurality of allocated blocks in memory to determine if the program is performing malicious heap spray in memory, wherein the threshold comparison includes determining that at least a predetermined number of the plurality of allocated blocks of memory match.

19. The method of claim 12, further comprising:

calculating a hash of each of the plurality of allocated blocks in memory; and determining if the program is performing malicious heap spray in memory based on a threshold comparison of each hash of each of the plurality of allocated blocks in memory.

20. The method of claim 12, further comprising:

selecting a subset of each of the plurality of allocated blocks in memory for a hash calculation;

calculating a hash of the subset of each of the plurality of allocated blocks in memory; and determining if the program is performing malicious heap spray in memory based on a threshold comparison of each hash of the subset of each of the plurality of allocated blocks in memory.

21. The method of claim 12, further comprising:

selecting a plurality of subsets of each of the plurality of allocated blocks in memory for a plurality of hash calculations;

calculating a hash of each of the plurality of subsets of each of the plurality of allocated blocks in memory; and determining if the program is performing malicious heap spray in memory based on a threshold comparison of each hash of each of the plurality of subsets of each of the plurality of allocated blocks in memory.

* * * * *